May 1, 1928. 1,668,401
J. W. FRENCH
LOAD RETAINER FOR TRUCKS
Filed Jan. 29, 1927
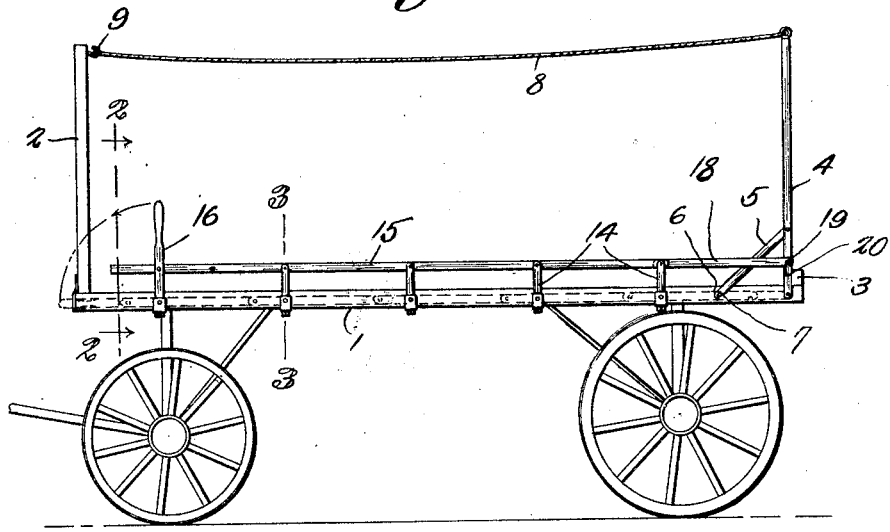
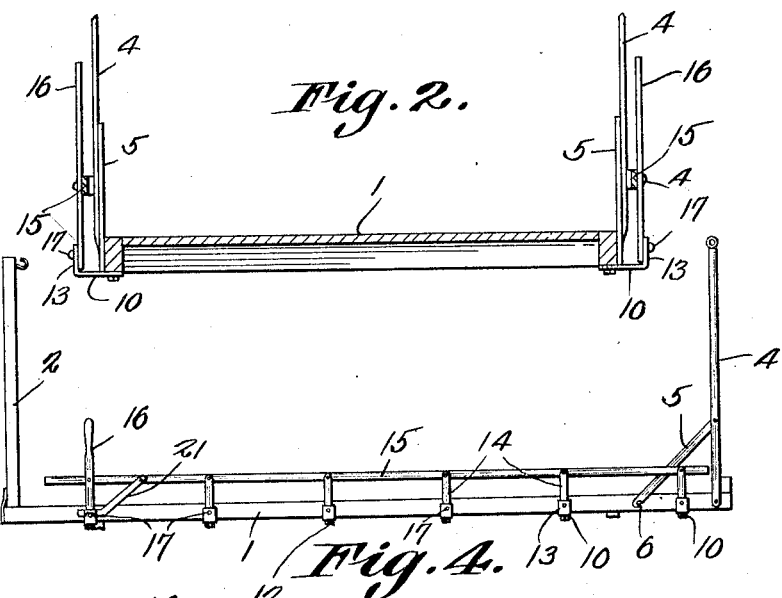
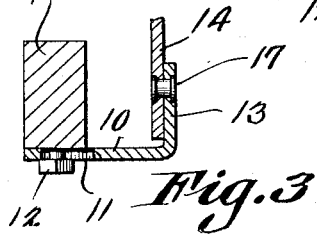
J. W. French
Inventor,
By C. A. Snow & Co.
Attorneys Patented May 1, 1928.

1,668,401

UNITED STATES PATENT OFFICE.

JOSEPH WEBB FRENCH, OF GREAT BEND, KANSAS.

LOAD RETAINER FOR TRUCKS.

Application filed January 29, 1927. Serial No. 164,545.

This invention relates to a load retainer for trucks of the type used for handling baggage, express packages and the like. Heretofore it has been the practice, when a large load is to be carried, to mount detachable panels at the sides and front end of the truck and to pile the articles therebetween. These panels are objectionable, however, because of their bulk, their cost, the time required to place and remove them, and the constant danger of misplacing or losing them. They are also objectionable because they definitely restrict the width of the load to the width of the floor or platform space of the truck.

It is an object of the present invention to provide a load retaining device constituting an integral part of the truck which can be shifted readily to active or inactive position according to the need and which, when in use, constitutes an efficient retainer for articles resting on the truck whether or not they project beyond the sides.

A further object is to provide a retaining device which is inexpensive to manufacture, and can be applied readily to trucks already in use.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a side elevation of a truck having the present improvements combined therewith.

Figure 2 is a vertical transverse section therethrough on the line 2—2, Figure 1.

Figure 3 is an enlarged section on line 3—3, Figure 1.

Figure 4 is a side elevation of a slightly modified form of the device.

Referring to the figures by characters of reference 1 designates the platform of a wheel truck of the usual construction, the same being provided at its front end with a transverse upstanding channel 2 such as commonly employed. A transverse cleat 3 may be secured upon the platform at the rear end thereof and pivotally connected to the sides of the platform close to the ends of this plate are standards 4 each of which has a brace 5 pivotally attached to it. One end of this brace can be provided with a hook 6 for engaging a lug 7 whereby the brace will be supported in an inclined position to hold the standard 4 in its upstanding position. The upper end of the standard may be connected to one side of the panel 2 by a rope 8 or other flexible device detachably engaging the panel as shown at 9. With one of the standards and rope 8 or the like at each side of the truck it will be apparent that large articles, such as trunks, barrels and the like standing on the platform can be retained efficiently without the use of the heavy side panels heretofore commonly employed.

Extending under each side of the platform 1 is a series of laterally extending arms 10 each having a longitudinal slot 11 for the reception of an attaching bolt 12 which engages the side of the truck and serves to bind the arm adjustably to the platform. The outer end of each arm is upturned to provide an ear 13 and pivotally attached to each ear is an upwardly extending link 14. All of the links are pivotally connected, at their upper ends, to a retaining rail 15. One of the links has an extension 16 projecting upwardly therefrom and constituting an operating handle. All of the links are parallel and the rail 15 is parallel with the line of pivots 17 of the links 14. Consequently, when the rail 15 is not in use for retaining purposes, the handle 16 can be swung in the direction indicated by the arrow in Figure 1 so that all of the links will thus be supported substantially horizontally at one side of the rail 15 and below the top surface of the platform 1. When the rail is to be used for retaining a load the same is elevated by swinging the handle portion 16 upwardly so that the several links will be extended substantially at right angles to the top of the truck platform. With the rail 15 thus positioned all small articles resting on the platform will be held against lateral displacement.

If desired the retaining rail 15 and the standard 4 may be operated independently in which event the parts will be arranged as disclosed in Figure 4. With the parts thus disposed it is necessary, in order to lower each standard 4, to disengage the brace 5 from the lug 6 whereupon said standard and the brace can be lowered to a horizontal position and will be supported by the adjacent arms 10. Under some conditions, however, it is desirable to couple the rails 15 to the standards 4 as shown in Figure 1. In this construction a link 18 can be pivotally connected to the link 14 nearest the standards and can be provided with a hook 19 or the like for engaging a stud 20 extending from the standard 4. With the parts thus assembled it will be obvious that by disengaging the brace 5 from its stud 7 the handle 16 can be used for swinging the standard as well as the link 14 and the rail 15 to their lower positions indicated by broken lines in Figure 1. By disconnecting link 18 from the stud 19, however, the rail 15 and the standard 4 can be independently shifted to raised or to lowered positions.

If desired a latch 21 can be pivotally connected to the rail 15, this latch being adapted to engage one of the pivot studs 17 or any other suitable projection so as to hold the rail 15 and its supporting link 14 in raised positions as shown in Figure 4.

What is claimed is:

1. The combination with a truck including a platform, standards connected to the respective sides of the platform, and braces detachably mounted at one end for holding the standards in upwardly extended positions, of arms connected to and extending laterally from the sides of the platform, upstanding links pivotally connected thereto, side rails supported by the links, said links being movable about their pivots to bring the rails to raised or lowered positions, said arms constituting supports for the rails and for the standards when lowered, and links detachably mounted at one end for connecting the standards to the rails.

2. The combination with a truck including a platform, of standards at the corner portions of the truck, detachable connections between the upper ends of the standards, arms connected to and extending laterally from the sides of the platform, upstanding links pivotally connected thereto, side rails supported by the links, said links being movable about their pivot to bring the rails to raised or lowered positions, the arms constituting supports for the rails and for the standards when lowered, an operating handle integral with one of the links of each side rail, a link connecting each side rail with one of the standards at one end of the platform, said links being detachably mounted at one end, and detachable means for supporting the said standards in upstanding positions.

In testimony that I claim the foregoing as my own, I have hereto affixed my signature.

JOSEPH WEBB FRENCH.